United States Patent [19]

Roberts

[11] Patent Number: 5,748,222
[45] Date of Patent: May 5, 1998

[54] LASER ANGROXING HEAD EMPLOYING ACOUSTO-OPTIC MODULATOR

[75] Inventor: Simon H. Roberts, London, Great Britain

[73] Assignee: ZED Instruments Ltd., Surrey, United Kingdom

[21] Appl. No.: 341,536

[22] PCT Filed: Jun. 10, 1993

[86] PCT No.: PCT/GB93/01235

§ 371 Date: Nov. 21, 1994

§ 102(e) Date: Nov. 21, 1994

[87] PCT Pub. No.: WO93/25387

PCT Pub. Date: Dec. 23, 1993

[30] Foreign Application Priority Data

Jun. 11, 1992 [GB] United Kingdom ............ 9212456
Sep. 2, 1992 [GB] United Kingdom ............ 9218567

[51] Int. Cl.$^6$ .................... B41T 2/47; G01D 15/14; G02B 26/00; G02B 27/00

[52] U.S. Cl. .................... 347/241; 347/239; 347/244; 347/243

[58] Field of Search .................... 219/121.6, 121.61, 219/121.62, 121.67, 121.68, 121.69, 121.75, 121.82; 358/299, 297; 347/231, 244, 241, 243, 236, 246, 247, 259, 260, 110

[56] References Cited

U.S. PATENT DOCUMENTS

| | | | |
|---|---|---|---|
| 4,313,185 | 1/1982 | Chovan | 367/149 |
| 4,492,435 | 1/1985 | Banton et al. | 359/230 |
| 4,623,219 | 11/1986 | Irias | 359/286 |
| 4,896,961 | 1/1990 | Ito | 250/461.2 |
| 5,109,149 | 4/1992 | Leung | 219/121.69 |
| 5,114,228 | 5/1992 | Greenfield et al. | 356/222 |

FOREIGN PATENT DOCUMENTS

| | | |
|---|---|---|
| 2446962 | 4/1976 | Germany. |
| 2709554 | 9/1977 | Germany. |
| 2719275 | 11/1977 | Germany. |
| 3008176 | 9/1980 | Germany. |
| 0072609 | 6/1982 | Germany. |
| 3818129 | 11/1989 | Germany. |
| 92/09399 | 6/1992 | WIPO. |

*Primary Examiner*—N. Le
*Assistant Examiner*—Raquel Yvette Gordon
*Attorney, Agent, or Firm*—Sughrue, Mion, Zinn, Macpeak & Seas, PLLC

[57] ABSTRACT

A laser engraving head (6) for use in preparing a medium for a printing process includes a deflector (AOM). The deflector, which may be an acousto-optic modulator, deflects the laser beam which is focused by a lens (L) onto the surface of the medium. The lens (L) may be arranged telecentrically with respect to the deflected laser beams so that the exit pupil (P) defined by the range of deflected beams is located at the back focal plane of the means for focusing. A number of interchangeable beam expanders (20) may be provided mounted within the head and moveable so that one of the expanders is brought into the path of the beam to provide a desired cell size. Control circuits for the head may modify the control signal applied to the deflector compensate for variations as a function of deflection angle in the cell size produced on the medium. Where the deflector is formed on a material, such as germanium, which is subject to thermal run-away, then the head may include sampling optics which deflect a portion of the beam upstream of the deflector and a power sensor which receives the deflected beam and is monitored to detect the incidence on the deflector of optical power exceeding a predetermined threshold.

31 Claims, 9 Drawing Sheets

DETAIL OF FOCUS $\omega = \frac{\lambda}{2NA}$

Fig. 7b

SAME NA

WIDE BEAM

LONG FOCAL LENGTH

Fig. 7c

ENTRANCE PUPIL

EXIT PUPIL

Fig. 7d

Fig. 8a
DIFFRACTION EFFICIENCY

Fig. 8b
COMPENSATION FUNCTION
C(D)

Fig. 8c
OUTPUT ACHIEVED

Fig. 8d
LINEARISATION FUNCTION
l(s)

Fig.11a
LASER CONTROL PULSE

Fig.11b
OUTPUT OF LAST DETECTOR

Fig.11c
DIFFERENTIATED OUTPUT

Fig. 12.

LASER ANGROXING HEAD EMPLOYING ACOUSTO-OPTIC MODULATOR

BACKGROUND TO THE INVENTION

The present invention relates to a laser engraving head suitable for use, for example, for preparing anilox rollers. It is particularly concerned with a head incorporating an acousto-optic beam deflector, such as that described in our co-pending international application no. PCT/GB 91/01829 filed Oct. 18, 1991.

Conventionally, when a laser engraving head is used to prepare an anilox cylinder, a ceramic-coated roller is rotated and the laser engraving head is moved parallel to the longitudinal axis of the roller. Typically the engraving head includes a plane mirror which receives light from the laser which is fixed at one end of the engraving apparatus. The head focuses light from the laser onto the surface of the roller. The combined effect of the rotation of the roller and lateral movement of the engraving head is to produce a helical pattern of cells on the roller. Typically the laser is pulsed, with one pulse corresponding to each cell.

Alternatively, to produce the helical cell pattern the roller may be moved laterally past the head whilst rotating, the head being fixed. This has the advantage of a fixed optical path length from the laser.

As described in our above-cited application, hitherto the speed with which cells can be engraved has been limited by such effects as channelling between adjacent cells, and smearing or deformation of cells. A significant increase in the frequency of engraving can be achieved by using a beam-deflecting device such as an acousto-optic deflector to deflect the engraving beam between cell sites. This may be used to track a given cell site as the roller moves at high speed, and also to skip between cell sites so that the cells are engraved in an order which serves to minimize problems such as channelling.

SUMMARY OF THE INVENTION

According to a first aspect of the present invention, a laser engraving head for use in an apparatus for preparing a medium for use in a printing process includes means for deflecting the laser beam, and means for focusing the laser beam onto the surface of the medium, the means for focusing being arranged telecentrically with respect to the deflected laser beams, the exit pupil defined by the range of deflected beams being located at the back focal plane of the means for focusing.

The present inventors have found that significant advantages are obtained by the adoption of a telecentric arrangement for the final focusing lens. The principle ray of each pencil of rays is then normal to the roller target. This has the effect that the distance of deflection of the laser beam on the surface of the roller is independent of the focus of the lens. This makes it possible to adjust the focal position of the lens in order, for example, to optimise the cell size and minimize the unengraved land between the cells.

Although the use of a telecentric configuration is much preferred, alternatively the effects of a non-telecentric configuration may be corrected for in software. The degree of divergence of the principle rays leaving the focusing lens then need to be calibrated with respect to the focal position of the roller. In use, the operator would set up the separation of the engraving head from the roller for the optimum cell shape (aspect ratio of cell opening to cell depth). Next the precise separation of the head from the roller would need to be sensed and fed to the controlling hardware. This could be achieved by a dial indicator with electrical feed out or a low voltage differential transformer (LVDT) displacement transducer. A look-up table or algorithm in software or hardware is used to apply the appropriate correction to the control signal for the acousto-optic deflector so that the deflection distance on the surface of the roller is correct.

The use of a telecentric configuration places constraints on the design of the other elements of the optical system of the engraving head. As described in further detail below, the present inventors have developed a head offering significantly improved performance, within those constraints.

Preferably the means for deflecting comprise an acousto-optic deflector.

When the laser engraving head is used, for example, to engrave small cells in ceramic-coated rollers, then the size of cell opening ranges from 25 μm upwards. The smallest cell size is comparable to the wavelength of $CO_2$ laser light of 10 μm so the focusing optics are diffraction limited.

The size limit is directly related to the angle of convergence of the beam at the surface of the medium being engraved, otherwise known as the numerical aperture or NA. This can be varied by varying the focal length of the focusing lens. A well filled lens with a short focal length results in a small focused spot.

Larger spots are required when engraving coarse cell counts in order for the cells to touch. The spot size can be increased by working out of focus. However by increasing the focal length of the lens instead, the deflection distance on the roller in the image plane resulting from a fixed angular range of deflection of the first order beam by the deflector device is also increased and this is advantageous particularly for large spots which need to be jumped a greater distance than small spots for a small cell pattern.

According to a second aspect of the present invention a laser engraving head for use in an apparatus for preparing a medium for use in a printing process includes means for deflecting the laser beam and means for focusing the deflected beams onto the surface of the medium, the said means for focusing being of a fixed focal length, and a plurality of interchangeable beam expanders mounted within the head, a selected one of the beam expanders being moveable into the path of the beam between the deflector and the means for focusing in order to provide a desired cell size.

Preferably the means for focusing are configured telecentrically and the beam expander is of the cross-over type.

The present inventors have realised that despite its apparent attractions, the use of different focusing lenses with a range of focal lengths in order to achieve optimum spot size brings with it a number of disadvantages which can be avoided by the use of different beam expanders instead.

With one focusing lens following the deflector, the unwanted order from the deflector has to be either separated in the same plane as the roller or separated before the lens. For the latter, the required clearance between the deflector and the lens to achieve -separation of the unwanted beam would preclude a telecentric use of the focusing lens.

Secondly, engraving of ceramic anilox rollers produces debris which must be kept clear of the final surface of the focusing lens. Any deposits on a lens which is used to transmit high-power beams will result in absorption of some beam power at the surface leading to overheating of the lens and shortening of its operational life. The normal practice is to fit a nozzle with pressurized air over the final optic to keep debris clear. It is also essential to seal any optics behind the final lens in order to avoid ingress of dust from the machining environment. In practice then it would be difficult to mount a set of different focusing lenses in view of the proximity of the air nozzle, or the need for a nozzle on each lens.

Thirdly, the option of exchanging focusing lenses through the front of the engraving head is undesirable because the lenses would need to pass through the dirty part of the equipment. Considering the working environment for engraving anilox rollers on a production basis, it is preferable to keep clean optical components away from the front of the machine.

Fourthly, a deflector such as an acousto-optic modulator, requires careful optical alignment. Furthermore, its incident beam must be tilted and offset with respect to the optical axis of the output beam (in the middle of the deflection range). To achieve these requirements, it is preferable to fix the acousto-optic device firmly in one position. However, a range of focusing lenses in the telecentric condition would dictate movement of the acousto-optic device.

Preferably the means for focusing are fixed in one position behind a pressurized air nozzle. Preferably the final optic of the means for focusing forms a window to a sealed compartment separating the other optical components from the machining environment. Preferably the acousto-optic deflector is fixed in one position between the sealed compartment with corresponding fixed coupling optics to give the required angular and lateral offset to its incident beam.

According to a third aspect of the present invention, in a laser engraving head for use in preparing a medium for use in a printing process, the head including an acousto-optic deflector for deflecting a laser beam and means for focusing the deflected laser beam onto the surface of the medium, the head further comprises control means arranged to modify a control signal applied to the acousto-optic modulator so as to compensate for variations as a function of deflection angle of the cell size produced on the roller.

Preferably the control means are arranged to modify the control signal in accordance with a function generally complementary to the diffraction efficiency function of the acousto-optic deflector.

Acousto-optic deflectors do not have a flat deflection response across their deflection range. When engraving anilox cells out of sequence using the jump feature, the cells may differ in size according to the diffraction angle from the deflector. Accordingly a laser engraving head in accordance with this aspect of the invention applies a corresponding correction to the control signals supplied to the deflector so that these cells are engraved with uniform size. Typically the method of compensation will involve the following steps:

1. Measurement of diffraction efficiency at a number of deflection angles at full RF power.

2. Convert the measurements from 1. to into a "compensation function" of deflection angle D, c(D), based on a number of splines between measurement points or polynomial of several terms.

3. Measurement of diffraction efficiency as a function of the modulation control voltage (M) sent to the RF oscillator and power amplifier which drive the acousto-optic device. (This is required for linearisation of intensity control of the diffracted beam.) This measurement can be made at a number of deflection angles across the full deflection range of the acousto-optic deflector or at just one deflection angle for simpler implementation and slightly less precise hit compensation.

4. Convert the measurements from 3. into a linearisation function for required strength of transmitted beam S, 1(S), based on a number of splines between measurement points or polynomial of several terms.

5. Correct the modulation control voltage (M) which may have a maximum value of 255 from an 8-bit digital-to-analogue converter, depending on deflection angle:

$$M=1(c(D)) 255$$

According to a fourth aspect of the present invention, a method of operating a laser engraving head includes the step of modifying a control signal applied to an acousto-optic modulator so as to compensate for variations as a function of deflection angle in the cell size produced on the roller.

The light source for the laser engraving head is typically a high power $CO_2$ laser. Typical transmissive materials used with such lasers are zinc selenide and germanium. Of the two, germanium suffers from a potential problem of thermal run-away if over powered, as follows. Above a power threshold, high powers cause a temperature rise in the germanium which increases the optical absorption coefficient. This results in the run-away situation of further temperature increase leading to overheating and possible destruction of the optic. Therefore most high power applications tend to use zinc selenide which has a stable absorption coefficient and so does not suffer from thermal run-away.

According to a fifth aspect of the present invention, a laser engraving head includes a germanium acousto-optic deflector for deflecting the laser beam and means for focusing the laser beam onto the surface of the medium, the deflector being formed of a material subject to thermal run-away, is characterised by means for directing a portion of the beam from the optical path to the deflector to an optical power sensor, and means for monitoring the output of the power sensor to detect the incidence on the deflector of optical power exceeding a predetermined threshold.

Preferably the power sensor is a thermopile having a rapid response time.

Acousto-optic devices for use at 10.6 μm wavelength are generally based on germanium. This aspect of the present invention avoids the danger of thermal run-away by providing the head with a sensitive power sensor positioned before the acousto-optic device. This detects when the input laser beam is such that the appropriate operational power threshold of the deflector is likely to be exceeded. The over-power situation may be sensed, for example, by a voltage comparator on a thermopile output compared against a stable reference. The comparator output might send a logic signal indicating that the laser shutter should be closed.

The laser beam incident on the deflector is typically sampled using, e.g., a 5% sampling optic.

According to a sixth aspect of the present invention, in a laser engraving head for use in preparing a medium for use in a printing process, the head including an acousto-optic deflector for deflecting a laser beam and means for focusing the deflected laser beam onto the surface of the medium, the head further comprises means for detecting the leading edge of a pulse from the laser source, and means responsive to the said detector for generating a control signal to control the acousto-optic deflector to shut-off the trailing edge of the pulse.

A $CO_2$ laser can be pulsed for the engraving of ceramic-coated rollers for anilox printing applications. Pulsing is advantageous because the first part of the light output has a high peak power which results in effective removal of ceramic and deep cells. The technique of high frequency anilox engraving utilising an acousto-optic device also enables the $CO_2$ laser to be used in a continuous or CW (continuous wave) mode with a constant power output. However this is found to be less effective at engraving deep cells which is attributed to the low peak power.

A detrimental feature of the pulsed output from a $CO_2$ laser is when the power takes many microseconds to decay to zero. The problem of this trailing edge is that it continues to warm the surface of the ceramic. When a neighbouring cell is engraved shortly after, molten ceramic is found to flow into any adjoining cell that still has a warm surface. This effect is referred to as "dribble" because of its appearance and is unacceptable in a finished roller.

One technique of avoiding dribble is to switch off the trailing edge of the pulse using the modulating feature of the acousto-optic device. One problem in doing this is that the time delay between triggering the laser and the pulse output is variable. For an Electrox M1200 laser of 1200 W maximum output, the delay can vary over the range 20 to 40 µs. The initial high peak lasts for about 5 µs and an optimum pulse length for engraving some types of deep cells with a well annealed surface finish is about 20 µs. Therefore the possible variation in delay between laser trigger and pulse output is greater than the degree of control required of the pulse reaching the work piece.

This aspect of the application relates to an in-line pulse monitoring system that detects the start of the pulse output from a pulsed $CO_2$ laser. The beam is sampled using a partial reflector and a typical reflection coefficient is 1%. Detectors for 10.6 µm radiation with a sufficiently fast response time are the pyroelectric type made of lithium tantalate and the photoconductive type made of mercury cadmium telluride. The former is less expensive and more robust. Its output is ac coupled but this is not a problem with trying to detect the leading edge of a high power pulse.

A typical system differentiates the output from a pyroelectric sensor. A high power pulse shape has a rapid change on its leading edge and this appears as a high spike in the differentiated signal. The spike can be used in two ways. In one use, a timing circuit is used to measure the delay between the initial trigger and the pulse from the laser. A sample of several measurements can be taken and used to set the delay from the initial trigger for attenuation of a pulse by the acousto-optic device. In another use, the spike controls the later attenuation of that particular pulse so this use would operate pulse by pulse.

According to a seventh aspect of the present invention, a laser engraving head for use in preparing a medium for use in a printing process, the laser engraving head including an acousto-optic deflector for deflecting a laser beam and means for focusing the deflected laser beam onto the surface of the medium, further comprises means for applying a variable astigmatic correction to the beam in the light through the engraving head.

The present inventors have identified a hitherto unrecognised problem associated with the use of an acousto-optic deflector.

In the application of an acousto-optic device for engraving anilox rollers, it is found that first order beam focused onto the roller surface exhibits astigmatism. This cannot be accounted for by the optical path length through the acousto-optic medium since the incident and first order beams are well collimated. Astigmatism is not a problem with most acousto-optic devices for the visible and near infrared because they are thin.

For an acousto-optic deflector of 10.6 µm wavelength light, a typical optical path length through the acoustically modified zone of the body of the device is about 50 mm compared to a beam width of typically 6 mm. Astigmatism is found to be about 2%. This means that the difference in focal distance for orthogonal planes of the beam varies by a factor of 0.02. A 25 mm focal length brings one plane to focus at 25.0 mm and the orthogonal plane at 24.5 mm.

Anilox engraving of fine cell patterns uses the final lens at its diffraction limit. The problem of astigmatism is that the cell is only circular at one focal position and the option of varying the focus to optimise the cell size is lost. Another problem is that the circular cell obtained is larger than the diffraction limit would permit.

This aspect of the patent refers to a system for compensating or correcting the pseudo astigmatism introduced by an acousto-optic deflector. It may consist of a single or pair of cylindrical optics placed before or after the acousto-optic device. For example, a pair of cylindrical lenses of equal and opposite focal length can be rotated with respect to each other. The rotation allows for a variable cylindrical lens to be introduced. Rotation of the lens pair together chooses the plane of cylindrical focusing through the laser beam.

According to a further aspect of the present invention, a method of preparing a medium for use in a printing process including the steps of mounting the medium for rotation, and engraving the medium as it rotates with a laser engraving head, further comprises the step of producing a test engraving by operating an acousto-optic modulator in the path of the laser beam to shut-off the beam at times when the beam is impinging on the medium outside a predetermined circumferential portion.

Engraving of ceramic-coated rollers for anilox printing using a $CO_2$ laser usually requires test engravings to be done to ensure that all the settings have been set correctly. Typically a 5 mm wide band is available at each end of the roller, outside the useful printing length, where test engravings can be made. Because the test bands are narrow, test engravings are made over a number of circumferential zones.

A typical means for defining a small circumferential zone is to use a ring of aluminium tape as a mask with a small zone of the roller surface revealed through a cut out. Aluminium is used because it reflects the unwanted beam so does not get burnt onto the roller. However the reflected beam can reach the laser and affect its output so the test area engraved is not precisely representative of the main body of engraving along the roller. Also a mechanical mask is inconvenient to use and can only be moved to reveal a new area of the roller when the roller is stationary.

An electronic means for engraving only a small proportion of each revolution of the roller can be done by gating the trigger pulses to the laser. However the output from a pulsed $CO_2$ laser takes many pulses to settle down to a stable pulse shape. So the first pulses on starting are unrepresentative of the stable pulsing when the main roller is being engraved.

The laser output could be gated mechanically. However a shutter resilient to 100 W of beam power cannot be moved quickly enough for small sections of circumference of a roller rotating at 10 revolutions per second. Furthermore the movement of the shutter in crossing the laser beam would give unrepresentative pulses.

The method adopted according to this aspect is to use the modulating features of the acousto-optic device. The laser can be set up to pulse continuously. The RF power to the acousto-optic device can be gated to let these pulses through on the first order beam for just a small proportion of the roller rotation corresponding to an angle a. The gating can be synchronised to change between laser pulses so none of the pulses reaching the roller would be distorted.

According to a further aspect of the present invention, a laser engraving head for use in preparing a medium for use in a printing process including means for deflecting the laser beam and means for focusing the laser beam onto the surface of the medium, is characterised by a zoom beam expander located following the means for deflecting.

This aspect of the present invention provides a zoom beam expander which is continuously variable over the range of beam expansion factors necessary to give the required numerical apertures (convergence angles) on the surface of the medium. It provides many of the advantages of using interchangeable beam expanders as outlined above. The expander alone can then provide complete control over the spot size, without requiring variable focusing of the final focusing lens. This in turn removes the need to make the optical system of the head as a whole telecentric. The removal of this constraint makes possible the use of a zoom expander based on as few as three adjustable optical elements. By contrast, in order to maintain the fixed separation between entrance and exit pupils required for telecentricity, the zoom expander would need to use more than three elements, resulting in an increase in both design and manufacturing complexity and cost.

Using a zoom beam expander has a number of other advantages. The system always works at the beam waist and so provides the greatest depth of focus and least sensitivity to variation in the position of the printing medium. It is therefore better able to cope, for example, with eccentric errors in an anilox roller being engraved. The system as defined also gives the maximum possible deflection range on the roller for any given spot size selected.

Preferably the final lens of the means for focusing is arranged to have a fixed separation from the surface of the medium being engraved. Alternatively, variation of the focus on the roller may be permitted as another variable for control of cell profile. However, since the zoom beam expander and focusing lens combination are not telecentric, adjustment of the deflected distances as a function of focal position would then be required.

Preferably the zoom beam expander consists of at least three lenses. Preferably the first lens has a positive focal length so that the orders from the acousto-optic deflector are completely separated and a zero-order stop can be used. The range of positions of the second lens must never come closer to the first lens than the focal length of the first lens in order not to foul the zero-order stop. Preferably the section supporting the zero-order stop contains ducts for a coolant such as water. Cooling could also be achieved by a heat sink and forced air or convection. The use of a zero order stop is not limited in applicability to heads including a zoom beam expander, but may also be used in other head configurations as described herein, or in other optical systems.

The use of a single zoom assembly makes it considerably easier to cool the zero-order dump. Furthermore, the overall operation of the head is considerably simplified for the user since cell size is now determined by the single variable zoom setting, rather than by the combination of a choice of beam expander and focal position.

Of a three lens system, preferably the middle lens has a negative focal length and the final lens has a positive focal length for a wide zoom range. Designs based on all three lenses having positive focal lengths are also possible.

Alternatively, the zoom beam expander and final focusing lens could be combined into a single optical design. Preferably the overall distance between the deflector and final focus at the roller is constant over the full zoom range so that movement is only applied to optics with a low cooling requirement. Preferably the high power optics of the deflector and zero-order stop which require water cooling are fixed within an assembly that is moved as a whole when adjusted for roller diameter and focus.

Preferably a circular polarizer for, e.g., 10.6 μm infrared is positioned before the final focusing lens. This provides for isolation of the laser from reflections off the target since the deflector is most efficient for plane polarized light and a double pass through a circular polarizer in opposite directions results in a 90° rotation of the plane of polarization for the return beam.

Although it is much preferred that the deflector is an acousto-optic device, where appropriate other deflector types, such as a piezo-electric driven mirror, may be substituted.

Although the different aspects of the present invention described above may be used independently, significant advantages are obtained by using two or more of the above aspects, and more preferably all of the aspects in combination. Also, the different aspects are particularly advantageous when applied to the engraving of anilox rollers. The invention encompasses a system comprising an anilox roller mounted in an engraving apparatus including a head according to any one or more of the different aspects.

BRIEF DESCRIPTION OF THE DRAWINGS

An example of a method and apparatus in accordance with this invention will now be described in detail with reference to the accompanying drawings, in which.

DESCRIPTION OF EXAMPLES

Figure 1:
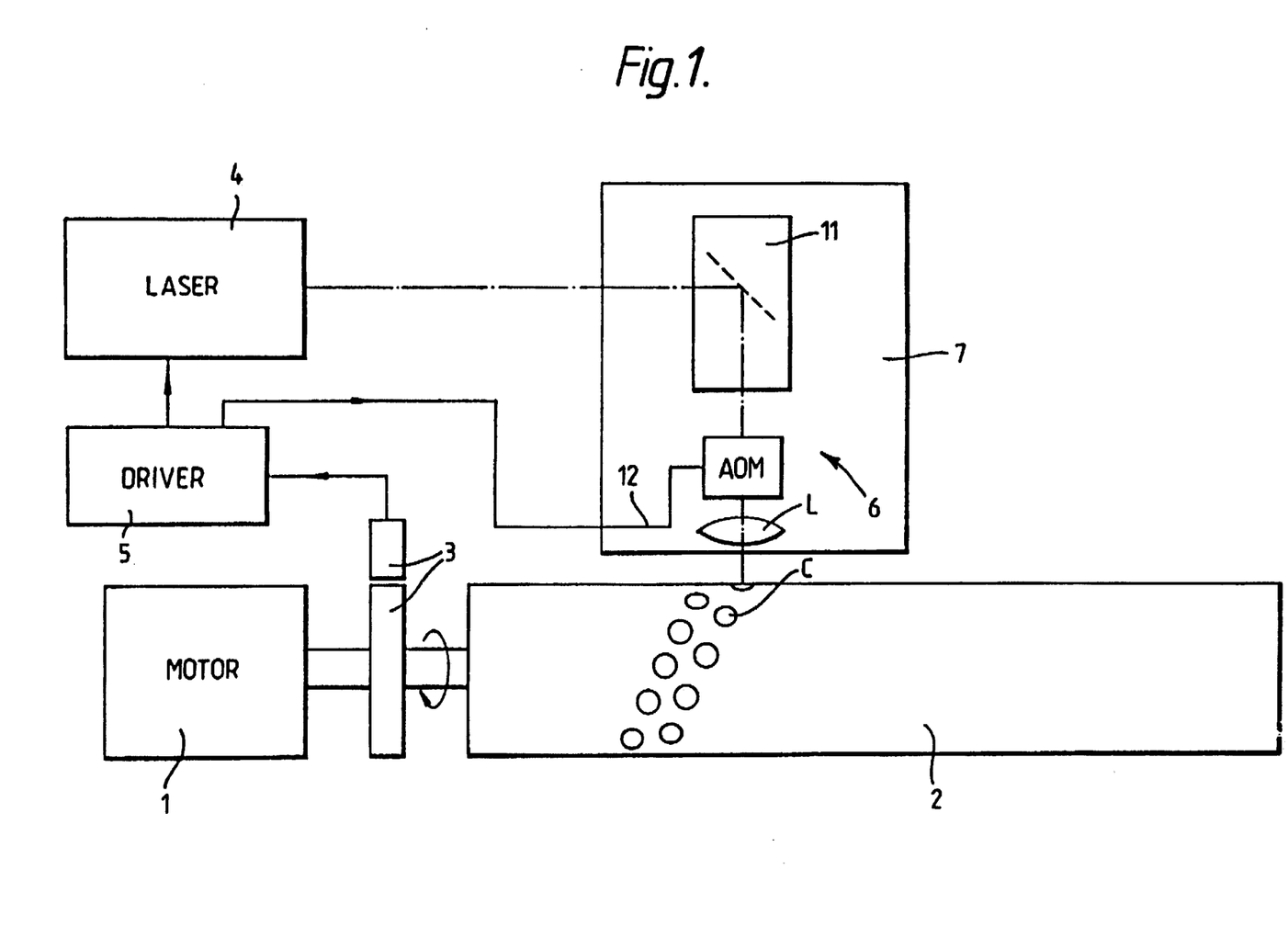
FIG. 1 is a diagrammatic plan elevation of a laser engraving apparatus.

In the present example, a laser engraving head 6 forms part of a laser engraving machine for engraving anilox rollers. The machine comprises a drive 1 which rotates an anilox roller 2 about its longitudinal axis. An encoder 3 attached to the drive 1 provides an output dependent on the angular position of the roller 2. A laser 4 with a polarised output driven by a laser driver 5 provides engraving pulses which are focused on the surface of the anilox roller 2 by a focusing element in the laser engraving head 6. The laser engraving head 6 is mounted on a carriage 7 which is movable in the axial direction along the anilox roller 2. The engraving head 6 includes an optical system including a plane mirror and the focusing element which, in the present example, is a focusing lens L which directs light from the laser onto the surface of the cylinder to engrave a series of cell sites C. In FIG. 1, the size, separation and helix angle of the cells are exaggerated for clarity. The physical construction of the laser engraving machine is generally conventional and will not be described in further detail.

An acousto-optic modulator 12 is mounted with the engraving head 6 on the carriage 7 in the path of the laser beam from the laser 4. An acousto-optic modulator is shown in further detail in FIG. 2. It consists of a single-crystal block of germanium 13 which provides a solid interaction medium for the laser beam. A piezoelectric transducer 14 is mounted on one face of the cell and an acoustic absorber 15 on the opposite face.

A suitable acousto-optic device is available commercially as the IntraAction model AGD-406B.

Figure 2:
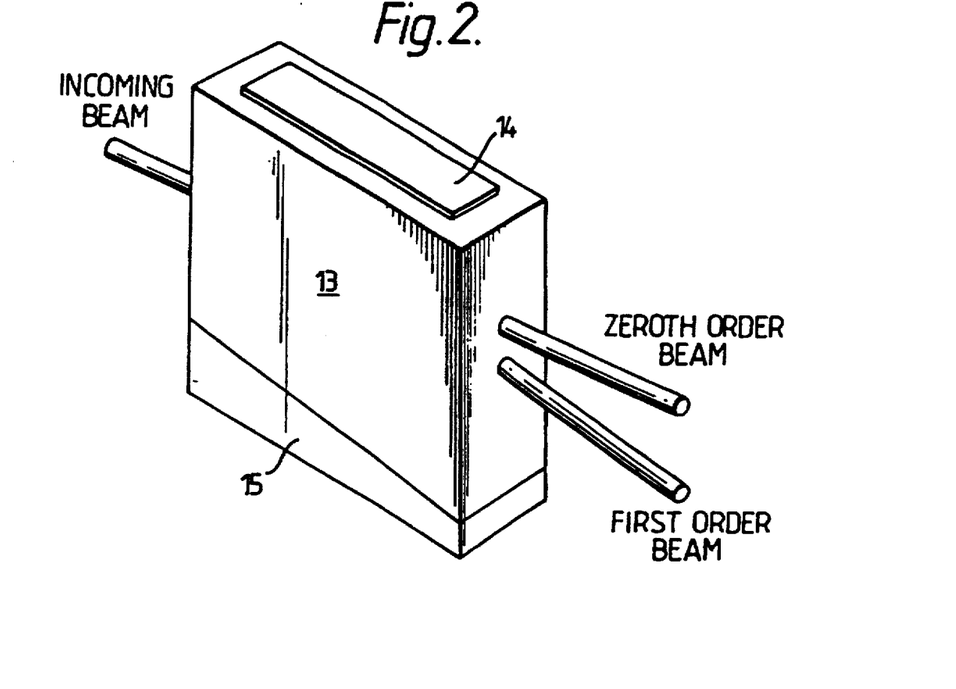
FIG. 2 is a perspective view of an acousto-optic modulator.

The principal of operation of the cell is to apply an RF voltage to the transducer so that an acoustic wave is generated in the germanium. This acoustic wave propagates across the block at 5.5 mm/μs and in turn generates strain-induced changes of refractive index. Since these changes are periodic, the cell acts as a thick diffraction grating. By analogy with X-ray diffraction through single crystals this is termed Bragg diffraction.

In the present example, the acousto-optic modulator 12 is of the type known as an acousto-optic deflector (AOD). It comprises a line of several transducers mounted on one face of the active medium. Typically as many as 4 to 6 separate transducers are used. A fixed time delay is introduced in the drive signal to each transducer so that the wavefront of the acoustic waves has a stepped rather than planar profile. Alternatively, the face of the germanium block can be stepped, with a separate transducer mounted on each step. The step height is arrange to give the required time delay between acoustic sources for a tilted wavefront through the block. By appropriate choice of the time delay, the angle of the wavefronts to the fixed direction of the incoming optical beam can be set close to the Bragg angle $\theta_b$ for a range of acoustic frequencies. This makes possible deflection of the beam over a range of different angles without significant loss in deflection efficiency.

Figure 3:
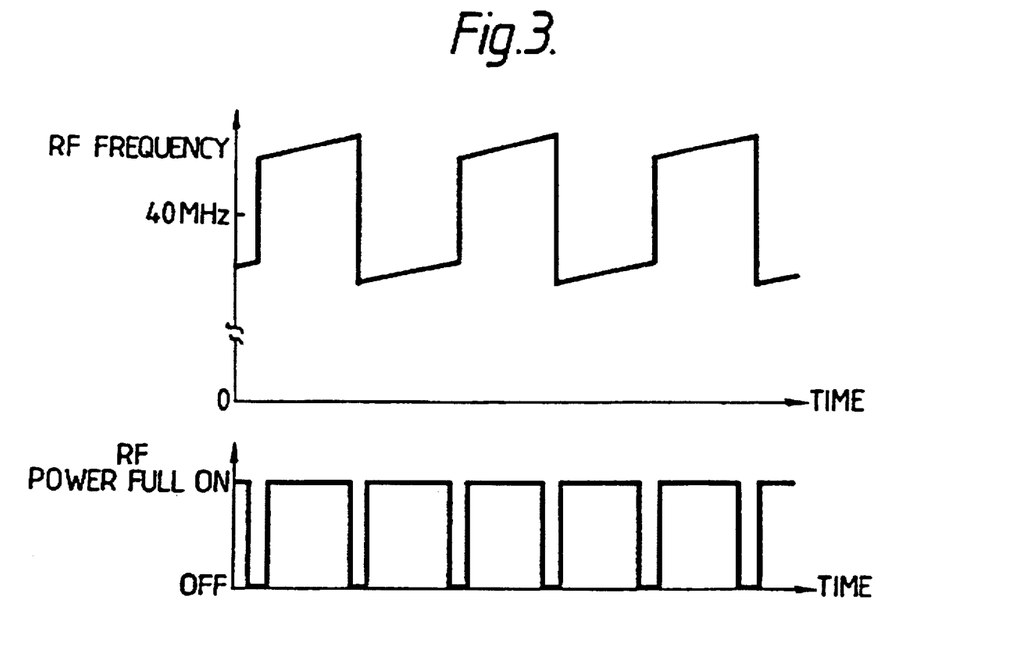
FIG. 3 is a frequency-time plot for the RF signal applied to the modulator of FIG. 2.

The spacing of the periodic changes of refractive index, and hence the angle through which the first order beam is diffracted, depends upon the applied RF frequency. In anilox engraving, the focusing lens for concentrating the laser beam onto the ceramic surface converts the beam direction into a position in the image plane on the surface. FIG. 3 shows the applied RF frequency used in the present invention as a function of time. By ramping the RF frequency with an appropriate gradient, the focused spot is caused to follow or track the surface of the cylinder so that the relative speed of the spot and the cylinder is zero.

After the beam has tracked a given cell site for long enough to engrave the site to the required depth, the RF power is switched off and the frequency applied to the acousto-optic modulator is changed discontinuously to a different value in order to move the beam on the surface of the cylinder at high speed from the current cell site to another cell site. The RF power is then switched on again. In the present example the beam is alternately deflected by two units of cell separation ahead and then behind the lens axis. Thus, for example, the beam is first deflected by −2 units onto what will become cell No. 1 and tracks this in the positive direction until cell No. 1 is formed. (Meanwhile, the roller has rotated by +1 cell unit). The beam is now deflected by +2 units and tracking the roller, as before, in the positive direction forms cell No. 2. This example produces an engraving sequence that includes $C_5$, $C_{10}$, $C_7$, $C_{12}$, $C_9$, $C_{14}$, $C_{11}$, $C_{16}$ . . . and so on. This method provides a minimum separation between any successively engraved cells of three cells, corresponding to a cooling time of two periods of the engraving frequency. A hit sequence is shown in Table 1.

As described in our above-cited co-pending application, other tracking sequences may be used. The provision of cooling periods between the engraving of adjacent cells enables the cells to be engraved at higher speed without problems such as channelling.

The tracking of individual cell sites is effective to avoid blurring. In addition it makes possible the provision of a low power after-pulse which is effective to anneal the surface of the engraved cell. This is found to give very marked advantages in engraving chromium oxide ceramic on laser-engraved anilox rollers. The initial pulse of about 5 As duration with a high peak power of 100 W or more removes the bulk of the material. This should be followed by a low power after-pulse of less than 100 W for at least 15 μs. Without this after-pulse, the surface of the ceramic tends to be blotchy. Pulsed $CO_2$ lasers have low power tails to the pulse that continue for longer than 15 μs. Accordingly by tracking the cell site so that the pulse remains directed at the cell during the 15 μs tail, provides the required after-pulse annealing.

Figure 4:
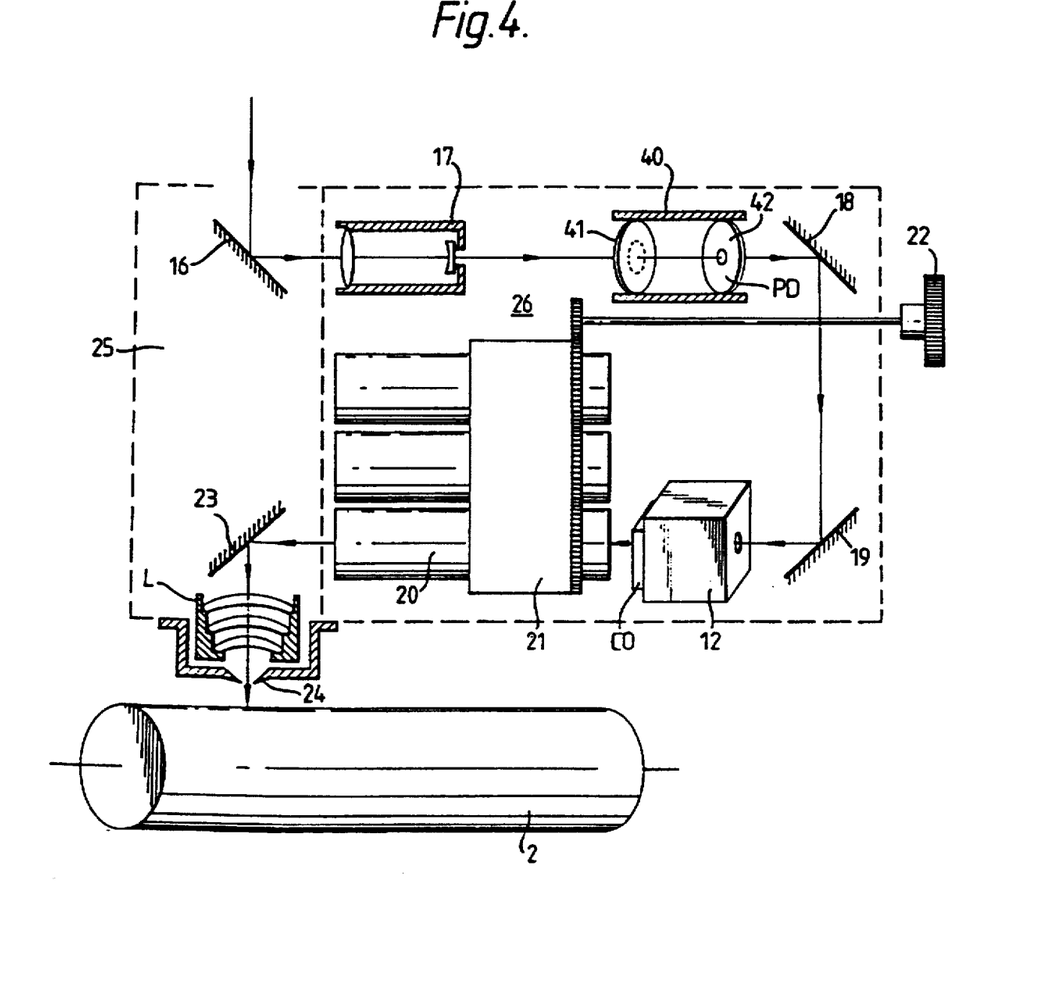
FIG. 4 is a diagram showing the layout of optical components in the engraving head.

FIG. 4 shows the layout of the laser engraving head. The incoming laser beam is deflected by a first mirror 16 into a sealed compartment containing the acousto-optic deflector and associated optical components. The first of these components is a beam reducer 17 which is effective to reduce the diameter of the laser beam. The beam subsequently passes to a system of sampling optics 40. These comprise in series firstly a 5% sampling optic and an associated thermopile 41, which, as described in further detail below, provides overload protection for the acousto-optic device. This is followed by a 1% sampling optic and an associated pyro-electric detector 42 which is used to synchronise the switching of the acousto-optic device to attenuate the trailing edge of the pulse from the laser. The beam is then deflected through 180° by further mirrors 18,19. The beam then enters the acousto-optic deflector 12. The zeroth order beam output from the deflector is dumped using the zeroth order stop described in further detail below. The first order beam is passed on through a beam expander 20. Four such beam expanders are mounted in a carousel 21 which is rotated to bring a selected beam expander into the optical path. A control knob 22 mounted on the outside of the case is mechanically linked to the carousel in order to rotate it.

The output from the beam expander 20 passes to a final mirror 23 which deflects it through 90°. It subsequently passes through the focusing lens L which in this example is formed as a triplet mounted behind a nozzle 24. Pressurized air passes through the nozzle in order to prevent the ingress of dust into the optics.

The section of the head comprising the first mirror 16, the final mirror 23 and the lens L and nozzle 24 is in this example formed as a removable cartridge 25 which makes a sliding fit with the main body of the head. This may be exchanged for an alternative cartridge which omits the mirrors 16 and 23 so as to provide a direct path through from the input to the body to the focusing lens L. This may be used for engraving cylinders when deflection of the beam is not required. The longitudinal axis of the sealed compartment 26 which forms the main body of the head lies at 45° to the horizontal axis of the roller. This facilitates the use of a phase shift mirror as the final mirror 23. This is effective to polarize the path in such a way as to reduce reflections back through the optical system.

The different components of the engraving head are described in further detail below.

Acousto-optic devices are in wide use for modulating and deflecting the output from lasers. When using only one output beam from the device, it is necessary to separate off the other beam at an aperture or some other sort of optical absorber.

High power $CO_2$ lasers for machining applications produce infrared light at 10.6 μm wavelength. Acousto-optic devices which operate at this wavelength are based on germanium as the acousto-optic medium. A typical range of acoustic frequencies for germanium devices is 30 to 70 MHz, corresponding to full diffraction angles between zero and first orders of 3.30 to 7.70, respectively. The minimum clearance between the acousto-optic device and an aperture for absorbing one of the beams is determined by the diffraction angle and beam size. For a typical beam width in the plane of diffraction of 6 mm, the minimum propagation distance for full separation of the zero and first order beams is 104 mm to 44 mm, respectively. In some applications, the acousto-optic device, used as a deflector, can be regarded as an entrance pupil. The separation of this pupil from optics that follow puts constraints on the overall size of the system.

This aspect of the system relates to a beam stop that can absorb a diffracted order beam of high power, such as from an acousto-optic device, within a short distance.

The first part of such a system is a lens of positive focal lens. Acousto-optic devices are most efficient with an incident beam that is near collimation, within the acceptance angle of the device. Therefore this lens will bring the zero and first order beams to a focus at its focal length (see FIG. 5). The focused beams are clearly smaller than their width on leaving the acousto-optic device so the beams are well separated for selective absorption of one. For high power beams of 10 W or more as used in machining applications, it is impractical to absorb the unwanted beam straight onto an absorbing surface. A mirror is used to deflect the unwanted beam so that it diverges and reaches an absorber obliquely over a wide area. For ease of machining and assembly, the deflector would be a conical mirror.

The technique of high frequency anilox engraving described in our above-cited application uses a deflection device to track a roller and jump the focused spot between cell positions. The control of deflection angle for precise jumping is important to achieve accurate cell placement.

Figure 6:
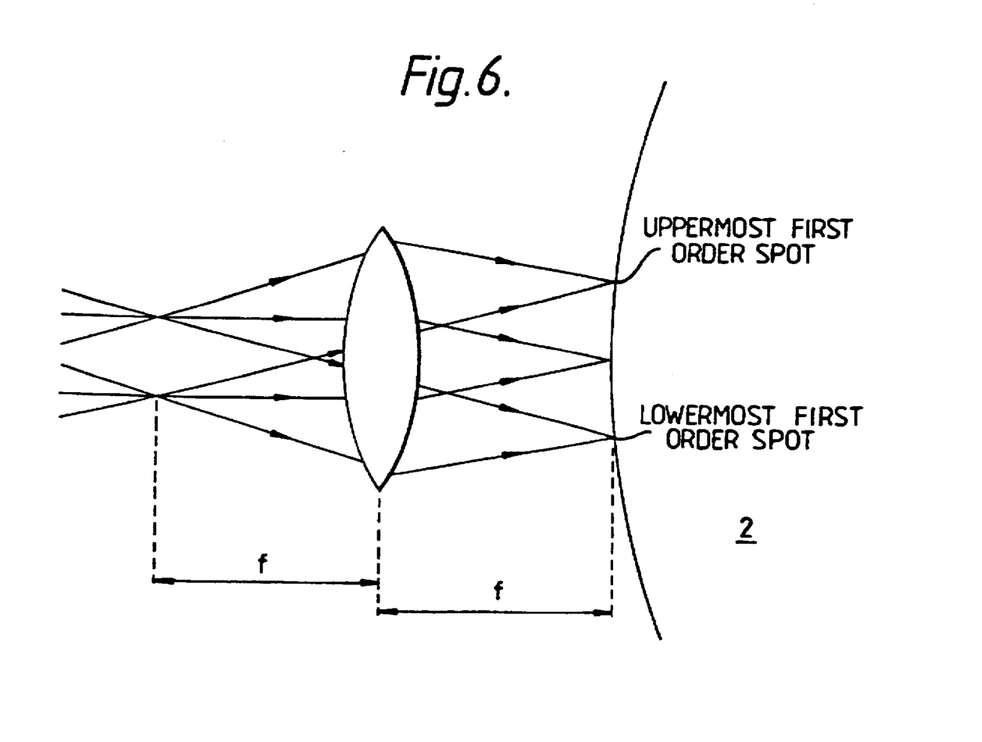
FIG. 6 is a diagram illustrating the telecentric condition of the focusing lens.
Figure 7A:
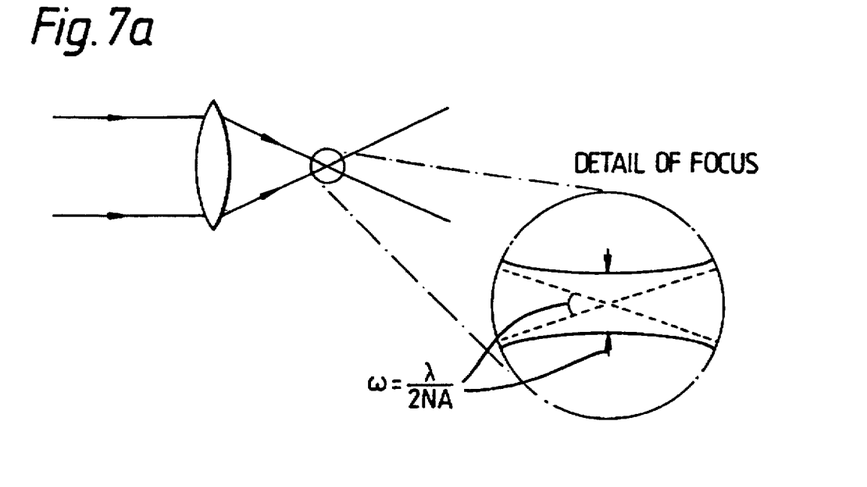
FIGS. 7a to 7d are diagrams illustrating beam expanders.
Figure 7B:
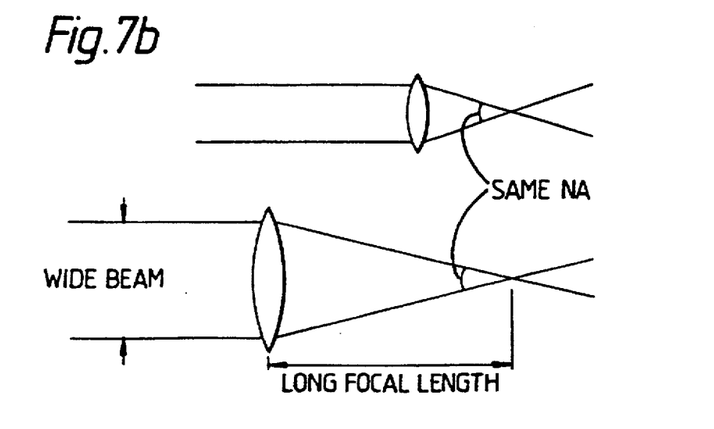
Figure 7C:
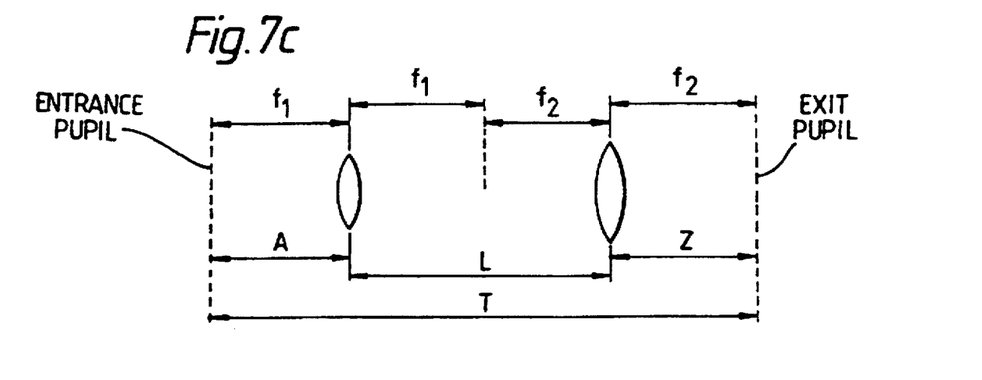
Figure 7D:
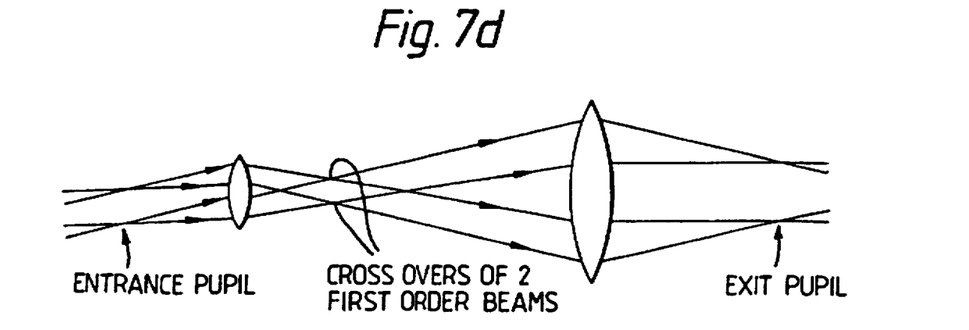
Figure 8A:
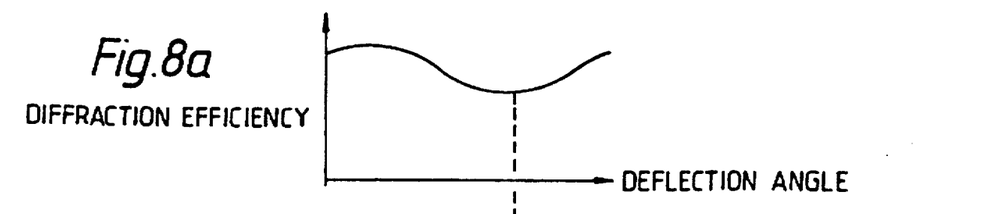
FIGS. 8a to 8d are plots of diffraction efficiency functions.
Figure 8B:
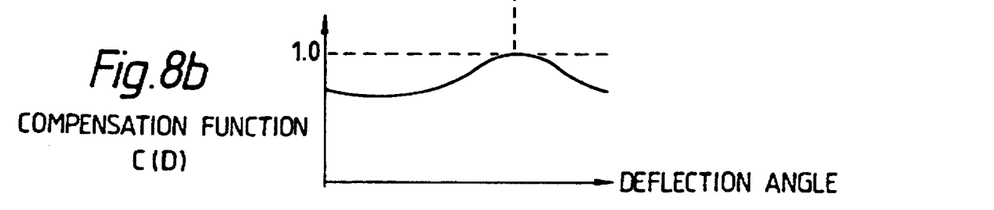
Figure 8C:
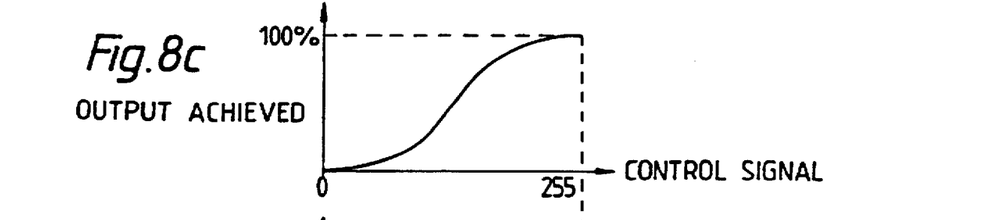
Figure 8D:
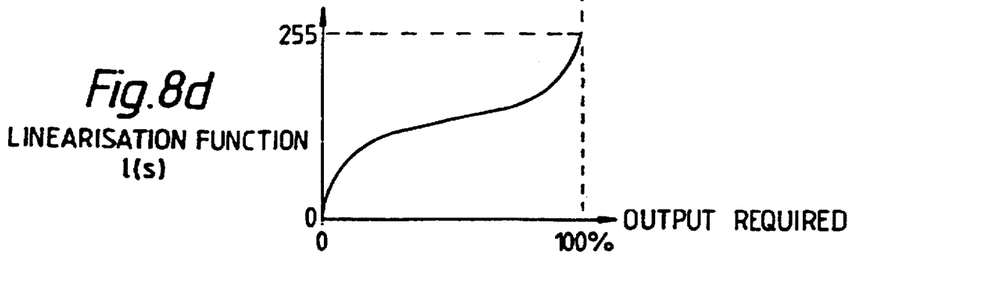

One variable used to optimise cell formation is focal position: it is sometimes necessary to adjust the lens to roller separation from best focus so as to increase the cell size and minimise unengraved land between cells. Considering the required precision of cell placement, operation of the whole system is simplified by ensuring that the jump distance is independent of focus. This is achieved by a telecentric use of the final focusing lens: the exit pupil P formed by the range of deflected beams is positioned at the back focal plane of the focusing lens (FIG. 6).

In the application of an acousto-optic device to engraving small cells in ceramic-coated rollers, the size of the cell opening ranges from 25 μm upwards. The smallest cell size is comparable to the wavelength of $CO_2$ laser light of 10 μm so the focusing optics are diffraction limited, although shown simply by the convergence of two lines in FIG. 6.

The size limit is directly related to the angle of convergence of the beam at the roller, otherwise known a numerical aperture or NA. This can be varied by focal length of the lens or degree to which the lens is filled by the incident parallel beam. A well filled lens and a short focal length, independently or together, result in a small focused spot.

Larger spots are required when engraving coarse cell counts in order for the cells to touch. The spot size can be increased by working out of focus. However by increasing the focal length of the lens instead, the deflection distance on the roller (in the image plane) resulting from a fixed angular range of deflection of first order beam by the acousto-optic device is also increased. This is particularly necessary for large spots which need to be jumped a greater distance than small spots for a small cell pattern.

Using a set of focusing lenses with a range of focal lengths to achieve optimum spot size and associated maximum deflection range has a number of problems.

A preferable optical configuration is to use just one focal length of focusing lens and fix it in one position behind a pressurized air nozzle. The final optic of this lens forms a window to a compartment that seals off all the other optical components from the machining environment. The acousto-optic device should also be fixed in one position, in this sealed compartment, with fixed coupling optics to give the required angular and lateral offset to its incident beam.

Turning to the need for variable spot size and deflection range, another way to achieve the maximum deflection range for the optimum spot size is to put a variable beam expander between the acousto-optic device and lens, as shown in FIG. 6. Expanding the beam decreases the spot size. It also decreases the beam divergence and hence deflection distance by the same factor.

The use of exchangeable beam expanders within the requirement for telecentricity of the final lens puts a tight constraint on the optical design of the beam expanders. The usual design of beam expander or beam reducer (telescope) for high power beams uses the Galilean configuration where the beam is never focused. This prevents any risk of plasma formation in gas. However the optical constraints above can only be solved by the cross-over type of beam expander, equivalent to the "Astronomical" type of telescope. Anilox engraving does not require kW beam powers so there is no risk of causing a gas plasma at the intermediate focus. It is only necessary to keep the intermediate-focus space free of dust.

The problem of design of beam expander is soluble and has been summarised in one formula. This relates particular expansion factors to lens positions as follows:

$$Z = \frac{M(T - A(M+1))}{M+1}$$

Where

Z=separation between second lens and exit pupil,

M=magnification factor of beam expander,

T=separation of entrance and exit pupils,

A=separation between entrance pupil and first lens.

For a given separation of lenses, L, and magnification, the focal length of each lens is as follows:

$$L = T - A - Z$$

$$f_1 = \frac{1}{M+1} L; f_2 = \frac{M}{M+1} L$$

As an example, the minimum focal length of the focusing lens is about 25 mm in order to have adequate clearance for a nozzle fed by pressurised air. A typical width of beam from the acousto-optic deflector is 6 mm. A reasonable limit of numerical aperture to maintain diffraction limited performance is 0.5. (This gives a smallest resolvable spot of 10 μm at the half intensity, as calculated from the Rayleigh formula of wavelength divided by 2×NA.) The beam diameter required at the focusing lens is 25 mm so the beam expansion factor needs to be 4.2x. A reasonable separation between entrance and exit pupils is 230 mm. So for a Z of 35 mm, the formula gives a value for A of 38.8 mm.

In critical applications, it is necessary to take all precautions for isolation of the laser source against reflections from the work piece that might vary. The usual practice is to polarize the output from the laser and include a polarization rotator so that reflected beams have a perpendicular plane of polarization which is rejected before entering the laser. For 10.6 μm wavelength of infrared, the usual means of polarization rotation is a phase shift mirror. In the anilox engraving system using an acousto-optic device, these devices are most efficient with plane of polarization parallel to the plane of diffraction. Therefore use of a phase shift mirror, which converts plane to circular polarization, must follow the acousto-optic device. In designing the separation of optics for the beam expanders according to the formulae above, distances A or Z must be adequate for inclusion of a phase shift mirror.

Acousto-optic deflectors do not have a flat deflection response across their deflection range. When engraving anilox cells out of sequence using the jump feature, cells may differ in size according to the diffraction angle from the deflector.

By use of compensation in the control system, this difference can be corrected out, as described in the introduction.

As an example, the minimum diffractive efficiency may be 55%. At another angle of deflection, D, the diffractive efficiency might be 68%. Therefore the value of the compensation factor, c(d), at D would be 0.809 (from 55 divided 69 in order to bring the diffractive efficiency at any deflection angles down to the same value). The control signal for full RF power, 1(100%), may be 255. For a reduced strength S of 80.9% necessary for the hit compensation at D, the function 1(S) may return 163, say, i.e. not necessarily 80.9% of 255.

The first order beam does not maintain exactly the same optical characteristics across the deflection range of an acousto-optic device. Apart from variations in diffractive efficiency, the hit compensation process can include any other variations across the deflection range of the whole system which might cause a variation in cell size that is formed. One possible variation may be a curved image plane produced by the final focusing lens so that a beam position at the limit of deflection range is slightly out of focus so producing a shallower cell.

Acousto-optic devices for use at 10.6 μm wavelength are based on germanium. A typical device for deflecting beams, such as the IntraAction model AGD-406B, is limited in optical power to 100 W. When a $CO_2$ laser is used for high frequency anilox engraving in a pulsed mode, the average power of the pulsed output would be less than 100 W, while the laser has the potential for a maximum continuous output of many hundreds of watts. Therefore it is necessary to protect the acousto-optic device from potentially damaging high powers.

The head includes a sampling optic and a precise power sensor positioned before the acousto-optic device. A typical power sensor would be a thermopile with sufficiently rapid response time to detect high powers before the acousto-optic device becomes over heated. Such a thermopile is supplied by Ophir, model number 10A-HP, which has a response to 90% of the incident power of 1.0 seconds. The thermopile would receive its power via a sampling optic. A typical partial reflectivity would be 5% since the thermopile indicated has a sensitivity of about 1.5 mV/W.

The over-power situation would be sensed by a voltage comparator on the thermopile output comparing against a stable reference. The comparator output would send a logic signal indicating that the laser shutter should be closed.

Figure 12:
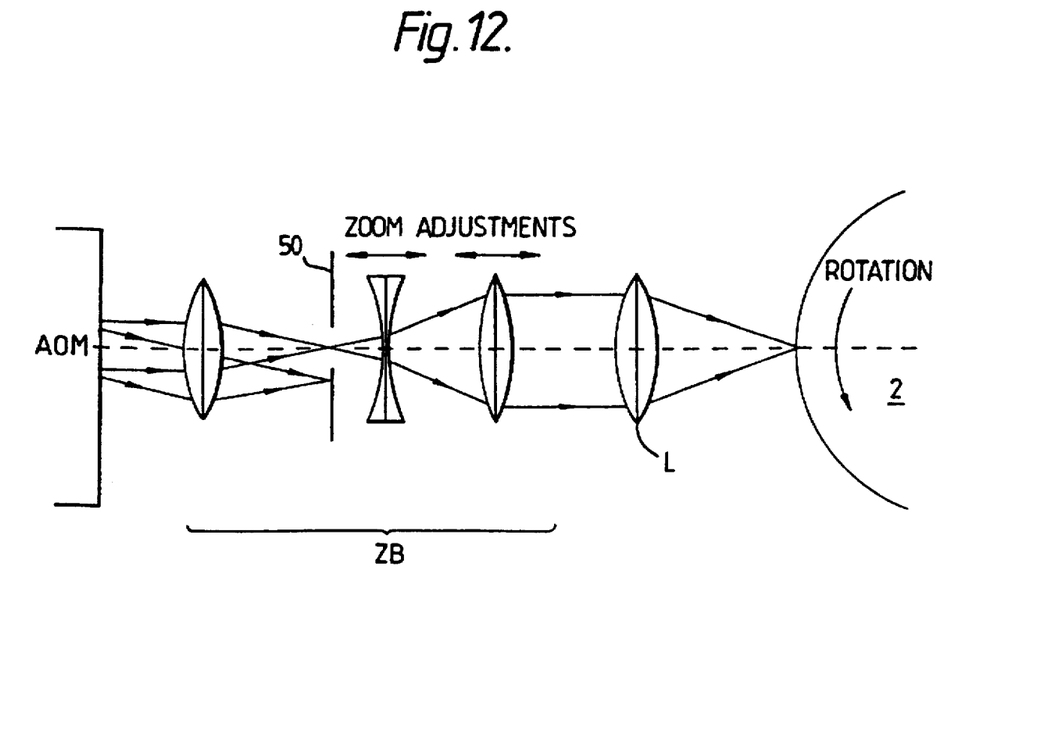
FIG. 12 shows a zoom beam expander.

As an alternative to the use of interchangeable beam expanders and a telecentric configuration, the head may incorporate a zoom beam expander as shown in FIG. 12.

The zoom beam expander of this example comprises a three lens system mounted between the deflector and the roller. The first element is fixed and includes a zero-order stop. The second and third elements are moved to provide zoom adjustments. The adjustment mechanism may be of the type conventional in photographic zoom lenses, whereby a rotational drive applied to a cylindrical housing for the lens is converted into appropriate longitudinal movement of the lens elements by two appropriately shaped grooves formed around the inner cylindrical surface of the housing. Alternatively, each of the two adjustable lens elements may be driven independently under the control of software arranged to maintain the appropriate relationship between the two lenses for a given zoom setting.

Figure 5:
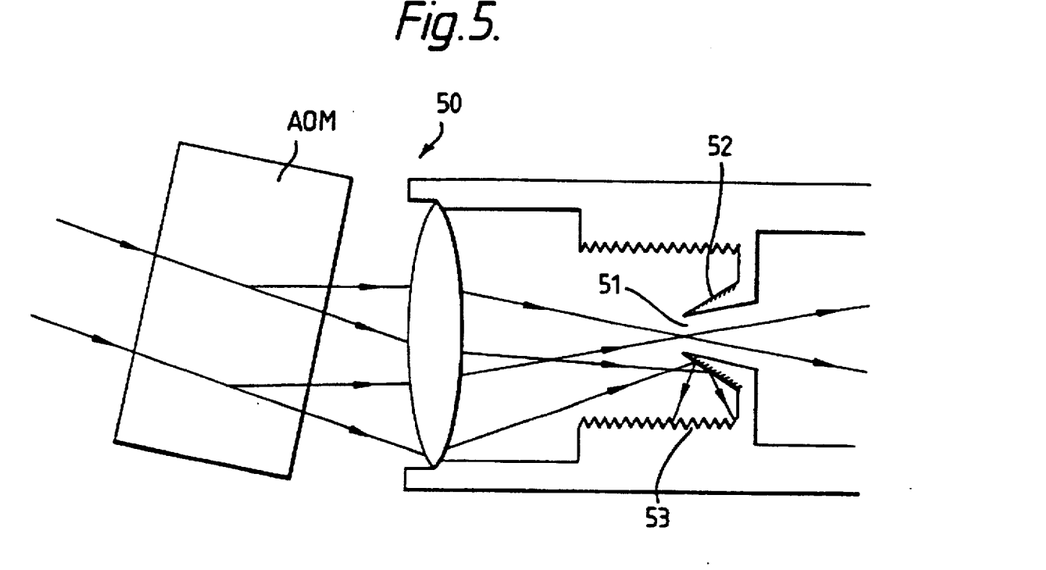
FIG. 5 is a sectional view of a zero-order stop.

In the present example the zoom expander includes the zero-order stop as shown in FIG. 5.

Figure 9:
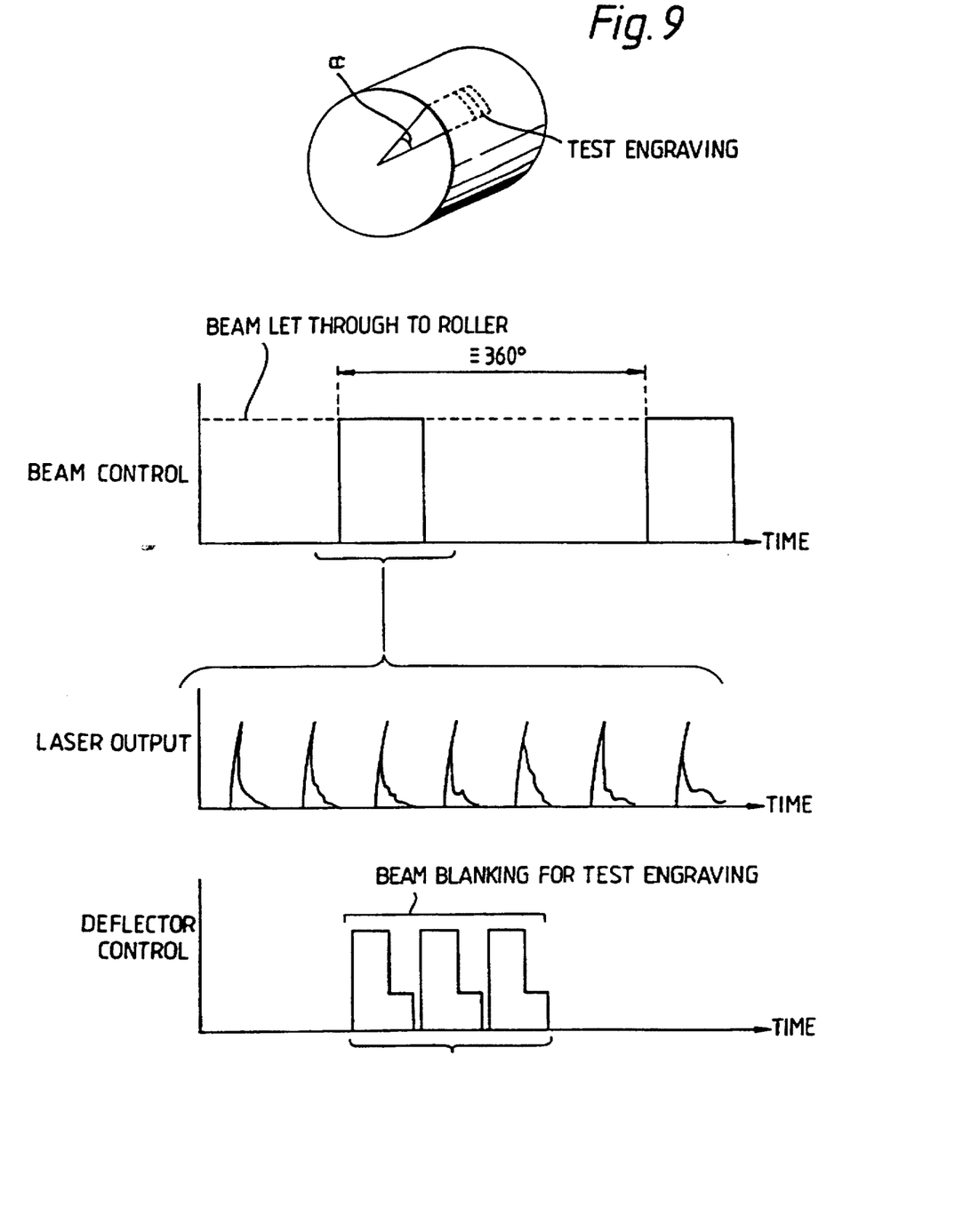
FIG. 9 is a diagram illustrating beam-blanking.
Figure 10:
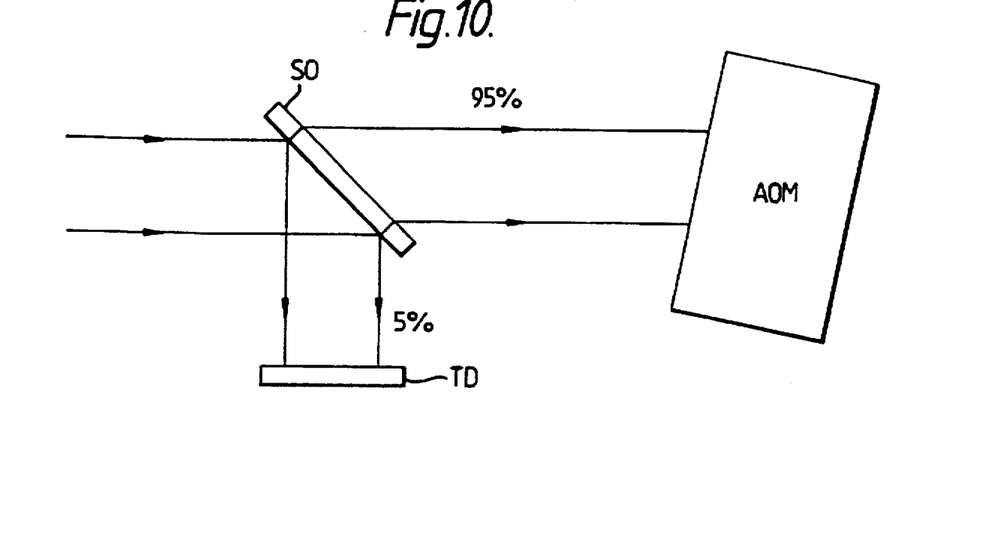
FIG. 10 shows the sampling optics for a thermopile detector.
Figure 11A:
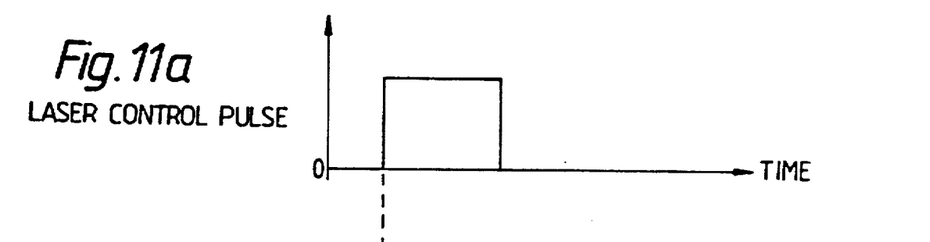
FIGS. 11a to 11c are time plots illustrating the use of a fast beam detector.
Figure 11B:
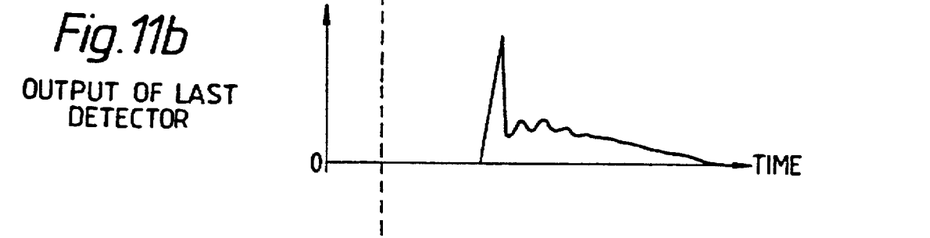
Figure 11C:
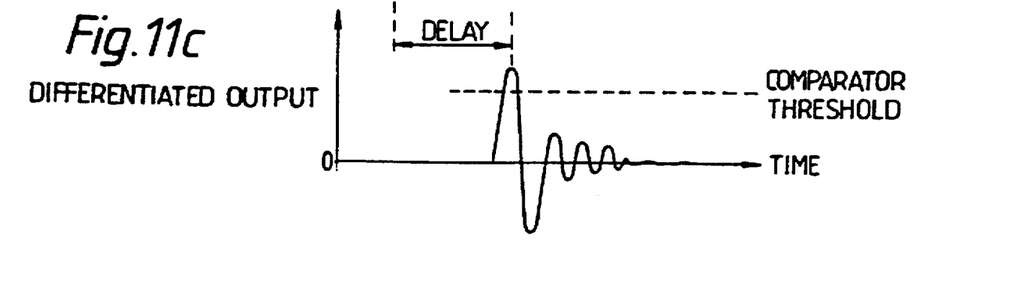

As described on pages 11 and 12 above, the acousto-optic modulator (AOM) as well as being used to deflect the beam, can also be used for beam blanking to produce a test engraving. As shown in the upper plot of FIG. 9, the beam is transmitted through to the roller for just a small proportion of the rotational period of the roller corresponding to an angle α. This enables the test engraving to be reduced while allowing the laser source to operate continuously, whether in pulsed or CW mode as in the example shown in the second plot of FIG. 9. The transmission characteristics of the deflector are shown in the bottom plot and have a stepped profile arranged to attenuate the trailing edge of each pulse from the laser. In the example shown in the Figure, the period corresponding to the angle a is occupied by three laser pulses and there are a corresponding three synchronised pulses in the transmission characteristics of the modulator.

TABLE 1

Single hitting with jumping from jump sequence −2½/+1½.

| Hit type | Hit number | Jumps | Order of cell placement | Pattern along roller | | |
|---|---|---|---|---|---|---|
| A | 9 | | 7 | A | B | |
| B | 10 | | | | B | A |
| | | | 12 | B | A | B |
| A | 11 | | 9 | A | B | |
| | | | | | B | A |
| B | 12 | | 14 | B | A | A |
| A | 13 | +11/2 | 11 | A | B | A |
| B | 14 | −21/2 | 16 | B | A | |
| A | 15 | | 13 | A | B | A |
| | | | | | B | A |
| B | 16 | | 18 | B | A | B |
| A | 17 | | 15 | A | B | A |
| | | | | | B | A |
| B | 18 | | 20 | B | A | B |
| A | 19 | | | | | |

I claim:

1. A laser engraving head (6) for use in an apparatus for preparing a medium for use in a printing process, including an acousto-optic modulo (AOM) for deflecting laser beams, means (L) for focusing the deflected laser beams onto a surface of the medium, and a stop (50) arranged to provide an optical dump for an unwanted order output from the modulator, characterised in that the means for focusing (L) are arranged telecentrically with respect to the deflected laser beams, an exit pupil (P) defined by a range of deflected beams being located at a back focal plane of the means for focusing, and in that the head further comprises a plurality of interchangeable beam expanders (20) mounted within the head (6), a selected one of the beam expanders (20) being movable into a path of the laser beams between the modulator and the means for focusing in order to provide a desired cell size.

2. An engraving head according to claim 1, in which the means for focusing (L) are a fixed focal length.

3. An engraving head according to claim 2, in which the beam expanders (20) are of the cross-over type.

4. An engraving head according to claim 1, in which a final optic of the means for focusing (L) forms a window to a sealed compartment separating the other optical components from the machining environment.

5. An engraving head according to claim 4, in which the modulator (AOM) is fixed in one position between the sealed compartment and the corresponding fixed coupling optics to give the required angular and lateral offset to its incident beam.

6. An engraving head according to claim 1, further comprising control means for modifying a control signal applied to the deflector (AOM) so as to compensate for variations as a function of deflection angle in the cell size produced on the medium.

7. A laser engraving head according to claim 1, in which the stop (50) comprises an aperture (51) for passing one beam order, an inclined mirror surface (52) arranged to reflect divergingly an unwanted beam order, and an absorbing surface (53) arranged to receive and absorb the reflected unwanted beam order.

8. A laser engraving head according to claim 7, in which the mirror surface (52) and aperture (51) are provided by a truncated hollow conical mirror and the absorbing surface (53) is formed on an inner surface of a housing around the conical mirror.

9. A laser engraving head (6) for use in an apparatus for preparing a medium for use in a printing process, including an acousto-optic modulator (AOM) for deflecting laser beams, means (L) for focusing the deflected laser beams onto a surface of the medium, and a stop (50) arranged to provide an optical dump for an unwanted order output from the modulator, characterised in that the means for focusing (L) are arranged telecentrically with respect to the deflected laser beams, an exit pupil (P) defined by the range of deflected beams being located at a back focal plane of the means for focusing, and in that the head further comprises a plurality of interchangeable beam expanders (20) mounted within the head (6), a selected one of the beam expanders (20) being movable into a path of the laser beams between the modulator and the means for focusing in order to provide a desired cell size, in which the means for focusing (L) are fixed in one position behind a pressurised air nozzle (24).

10. A laser engraving head (6) for use in an apparatus for preparing a medium for use in a printing process, the laser engraving head including a deflector (AOM) for deflecting laser beams and means (L) for focusing the laser beam onto the surface of the medium, the deflector being formed of a material subject to thermal run-away, characterised by means (50) for directing a portion of the beams in an optical path to the deflector to an optical power sensor, and means (TD) for monitoring the output of the power sensor to detect the incidence on the deflector of optical power exceeding a predetermined threshold, further comprising means (PD) for detecting a leading edge of a pulse from a laser source, and means responsive to said detecting means for generating for generating a control signal to control the acousto-optic deflector to shut off the trailing edge of the pulse.

11. An engraving head as claimed in claim 1, further comprising control means (μP) for modifying a control signal applied to the modulator so as to compensate for variations as a function of deflection angle in the cell size produced on the medium.

12. An engraving head according to claim 11, in which the control means (μp) are arranged to modify the control signal in accordance with a function generally complementary to a diffraction efficiency function of the deflector (AOM).

13. An engraving head according to claim 11, in which the modulator (AOM) is formed of a material subject to thermal run-away, wherein said stop deflects a portion of the beams in the optical path to the modulator.

14. An engraving head according to claim 13, in which the deflector (AOM) is a germanium acousto-optic deflector.

15. An engraving head according to claim 13, 10 or 14, in which the power sensor (TD) is a thermopile having a rapid response time.

16. An engraving head according to claim 15, further comprising means responsive to the optical power sensor arranged to cut-off or attenuate the laser beam when the optical power on the deflector exceeds the predetermined threshold.

17. An engraving head according to claim 16, including a voltage comparator for comparing the thermopile output with a fixed reference voltage.

18. A laser engraving head (6) for use in preparing a medium for use in a printing process, the head including an acousto-optic deflector (AOM) for deflecting a laser beam and means for focusing the deflected laser beam onto a surface of the medium, characterised by means (PI) for detecting a leading edge of a pulse from a laser source, and means responsive to said deflector for generating a control signal to control the detecting means to shut-off a trailing edge of the pulse.

19. An engraving head according to claim 18, in which the means for detecting (PD) include a partial reflector arranged in the laser beam and a pyro-electric or photoconductive photosensor arranged to receive a sampled beam.

20. An engraving head according to claim 18, further comprising means (CO) for applying a variable astigmatic correction to the laser beam passing through the engraving head.

21. An engraving head as claimed in claim 1, further comprising means (CO) for applying a variable astigmatic correction to the beams.

22. An engraving head according to claim 21, further comprising means for producing a test engraving by operating the acousto-optic modulator to shut-off the beams at times when the beams are impinging on the medium outside a predetermined circumferential portion.

23. A laser engraving head (6) for use in preparing a medium for a printing process, the head including an acousto-optic modulator (AOM), characterised by means for controlling the acousto-optic modulator to shut-off a laser beam when the beam is impinging on the medium outside a predetermined circumferential portion.

24. A laser engraving head (6) for use in preparing a medium for a printing process, the head including means for directing a laser beam onto a surface of the medium, characterised by a zoom beam expander (ZB) located in a path of the laser beam and arranged to set a spot size on the medium, said zoom beam expander (ZB) comprising three lenses arranged in series, a first of said three lenses in order from the laser beam having a positive focal length.

25. A laser engraving head according to claim 24, in which a final lens of means for directing the laser beam onto the surface is arranged to have a fixed separation from the surface of the medium.

26. An engraving head according to claim 24, further comprising a zero-order stop (50) arranged to provide an optical dump for a zeroth order output from the deflector.

27. A laser engraving system comprising an anilox roller (2) mounted in an engraving apparatus including a laser engraving head (6), said laser engraving head comprising an acousto-optic modulator (AOM) for deflecting laser beam beams, means (L) for focusing the laser beams onto the surface of a medium, and a stop (50) arranged to provide an optical dump for an unwanted order output from the modulator, characterised in that the means for focusing (L) are arranged telecentrically with respect to the deflected laser beams, an exit pupil (P) defined by a range of deflected beams being located at a back focal plane of the means of focusing, and in that the head further comprises a plurality of interchangeable beam expanders (20) mounted within the head (6), a selected one of the beam expanders (20) being movable into a path of the laser beams between the modulator and the means for focusing in order to provide a desired cell size.

28. A method of preparing a medium for use in a printing process including the steps of mounting the medium for rotation and engraving the medium as it rotates with the laser engraving head, characterised by producing a test engraving by operating an acousto-optic modulator in the path of a laser beam to shut-off the beam at times when the beam would otherwise impinge on the medium outside a predetermined circumferential portion.

29. A method of operating a laser engraving head, the head including an acousto-optic deflector, characterised by the step of modifying a control signal applied to the acousto-optic deflector so as to compensate for variations as a function of deflection angle in a cell size produced on the roller.

30. An optical stop (50) comprising an aperture (51) for passing one beam order, an inclined mirror surface (52) arranged to reflect divergingly an unwanted beam order, and an absorbing surface (53) arranged to receive and absorb the reflected unwanted beam order.

31. An optical stop according to claim 30, in which the mirror surface (52) and aperture (51) are provided by a truncated hollow conical mirror and the absorbing surface (53) is formed on an inner surface of a housing around the conical mirror.

* * * * *

UNITED STATES PATENT AND TRADEMARK OFFICE
CERTIFICATE OF CORRECTION

PATENT NO. : 5,748,222
DATED : May 5, 1998
INVENTOR(S) : Simon H. ROBERTS

It is certified that error appears in the above-indentified patent and that said Letters Patent is hereby corrected as shown below:

On the title page, item [54] and Column 1, line 1,

In the Title, delete "ANGROX ING" and insert --ENGRAVING--.

Signed and Sealed this

Twenty-first Day of July, 1998

Attest:

BRUCE LEHMAN

Attesting Officer

Commissioner of Patents and Trademarks